United States Patent
Lovmand

(10) Patent No.: US 8,638,786 B2
(45) Date of Patent: *Jan. 28, 2014

(54) METHOD OF CONTROLLING A WIND TURBINE IN A WIND POWER PLANT

(71) Applicant: Vestas Wind Systems A/S, Aarhus N (DK)

(72) Inventor: Bo Lovmand, Hadsten (DK)

(73) Assignee: Vestas Wind Systems A/S, Aarus N (DK)

( * ) Notice: Subject to any disclaimer, the term of this patent is extended or adjusted under 35 U.S.C. 154(b) by 0 days.

This patent is subject to a terminal disclaimer.

(21) Appl. No.: 13/919,575

(22) Filed: Jun. 17, 2013

(65) Prior Publication Data

US 2013/0277972 A1    Oct. 24, 2013

Related U.S. Application Data

(63) Continuation of application No. 12/625,244, filed on Nov. 24, 2009, now Pat. No. 8,503,443, which is a continuation of application No. PCT/DK2007/000260, filed on May 31, 2007.

(51) Int. Cl.
  *H04L 12/28*  (2006.01)
  *H04J 3/24*   (2006.01)
  *F03D 9/00*   (2006.01)
  *G05D 3/12*   (2006.01)

(52) U.S. Cl.
  USPC .............................. 370/389; 370/473; 290/44

(58) Field of Classification Search
  None
  See application file for complete search history.

(56) References Cited

U.S. PATENT DOCUMENTS

| 6,966,754 | B2 | 11/2005 | Wobben |
| 2003/0038617 | A1* | 2/2003 | Yaklin ........................... 323/304 |
| 2004/0230377 | A1* | 11/2004 | Ghosh et al. ...................... 702/3 |
| 2006/0037008 | A1 | 2/2006 | Stelzer et al. |
| 2007/0094645 | A1 | 4/2007 | Nardini et al. |
| 2010/0067526 | A1 | 3/2010 | Lovmand |

FOREIGN PATENT DOCUMENTS

| EP | 1519040 A1 | 3/2005 |
| EP | 1531376 A1 | 5/2005 |
| WO | 0177525 A1 | 10/2001 |
| WO | 2008145121 A1 | 12/2008 |

OTHER PUBLICATIONS

International Preliminary Report on Patentability and Written Opinion of the International Searching Authority; peT! DK2007/000260; Dec. 1. 2009; 8 pages.
International Search Report; PCT/DK2007/000260; Apr. 8, 2008; 2 pages.

* cited by examiner

*Primary Examiner* — Faruk Hamza
*Assistant Examiner* — Thinh Tran
(74) *Attorney, Agent, or Firm* — Patterson & Sheridan, LLP

(57) ABSTRACT

Embodiments herein control a wind turbine in a wind power plant where the wind turbine includes a wind turbine controller and at least one connected wind turbine component. Upon receiving a packet containing a "write/read" instruction, the wind turbine controller effectuates a write instruction by changing a set point associated with an attribute of a component in the wind turbine. The controller retrieves information data resulting from performing the write instruction from the component and transmits the information data to a central controller. The invention performs a fast and simple control loop by means of transmitting both the write and the read instruction within one single data packet.

13 Claims, 4 Drawing Sheets

METHOD OF CONTROLLING A WIND TURBINE IN A WIND POWER PLANT

CROSS-REFERENCE TO RELATED APPLICATIONS

The present application is a continuation of pending U.S. Ser. No. 12/625,244 filed on Nov. 24, 2009, which is a continuation of pending International patent application PCT/DK2007/000260 filed on May 31, 2007 which designates the United States, the contents of both of which are incorporated herein by reference.

FIELD OF THE INVENTION

The invention relates to a method of controlling a wind turbine in a wind power plant, the wind turbine comprises a wind turbine controller and at least one connected wind turbine component,

BACKGROUND OF THE INVENTION

The strategically distributed nature of wind power presents unique challenges. A wind power plant comprises several wind turbines and may be located offshore, and it often covers large geographic areas.

These factors usually require a variety of networked interconnections and telecommunication technologies for monitoring and controlling wind power electric generating facilities which often are referred to as SCADA (SCADA: Supervisory Control And Data Acquisition).

The prior art presents several ways of controlling a wind turbine and wind power plants. U.S. Pat. No. 6,966,754 teaches a method for monitoring wind turbines, by means of image and acoustic monitoring. This is an example of a wind turbine to control itself on the basis of dynamical measurement of factors within the wind turbine. European patent application EP 1519040 discloses a method for a remote reading and changing of power settings in wind turbine generators.

Today, the focus has moved from the separate turbine connection points to the central wind power plant connection point, often referred to as the "point of common coupling" (PCC). One of the most limiting factors when performing central control of a wind power plant with several wind turbines is the time it takes to gather information from all turbines and distributing control data, e.g. new active or reactive power set points to all turbines. This may be a problem since the requirements to wind power plant response times have increased considerably during the recent years. It is an object of the invention to provide a faster communication to and from wind turbines, thereby optimizing the central control of wind power plants.

SUMMARY OF THE INVENTION

One embodiment disclosed herein is a method of controlling a wind turbine in a wind power plant where the wind turbine includes a wind turbine controller and at least one connected wind turbine component. The method includes receiving, at the wind turbine controller, data packets originating from a central controller, where at least one of the data packets is a write/read instruction including one or more instructions that effectuate both a write function and a read function in the wind turbine. The method includes, during a first control loop execution in the central controller, effectuating a write instruction based on a desired value contained in the write/read instruction where the write instruction sets the desired value as a set point of an attribute of the wind turbine component. Also during the first control loop execution, the method includes retrieving a current value of the attribute from the wind turbine component and, upon receiving the current value from the wind turbine component, transmitting the current value to the central controller. The central controller is configured to determine, during a second control loop execution, an updated value for the set point of the attribute based on the current value, and the updated value is received at the wind turbine controller in a subsequently transmitted write/read instruction.

Another embodiment described herein includes a wind turbine controller located in a wind turbine and connected to at least one wind turbine component of the wind turbine. The wind turbine controller includes control circuitry configured to receive data packets originating from a central controller, where at least one of the data packets is a write/read instruction and the write/read instruction includes one or more instructions that effectuate both a write function and a read function in the wind turbine. During a first control loop execution in the central controller, the control circuitry is configured to effectuate a write instruction based on a desired value contained in the write/read instruction where the write instruction sets the desired value as a set point of an attribute of the wind turbine component. Also during the first control loop execution, the control circuitry is configured to retrieve a current value of the attribute from the wind turbine component and, upon receiving the current value from the wind turbine component, transmit the current value to the central controller. The central controller is configured to determine, during a second control loop execution, an updated value for the set point of the attribute based on the current value, and the updated value is received at the wind turbine controller in a subsequently transmitted write/read instruction.

Another embodiment described herein is a method for communicating between wind turbines and a central controller. The method includes establishing a data communication network connecting a plurality of wind turbines to the central controller. The method includes transmitting a write/read instruction to at least one of the plurality of wind turbines on the data communication network where the write/read instruction comprising one or more instructions that effectuate both a write function and a read function in the one wind turbine. The method includes, during a first control loop executing in the central controller, effectuating a write instruction based on a desired value contained in the write/read instruction where the write instruction sets the desired value as a set point of an attribute of a wind turbine component in the one wind turbine. Also during the first control loop, the method includes retrieving a current value of the attribute from the wind turbine component and, upon receiving the current value from the wind turbine component, transmitting the current value to the central controller. The method includes determining, during a second control loop in the central controller, an updated value for the set point of the attribute based on the current value and transmitting the updated value to the one wind turbine in a subsequent write/read instruction.

The term "wind power plant" is according to the present invention understood as a facility with one or multiple wind turbines operating as a single power plant and interconnected to the utility grid at a single point. Wind power plants are also called wind farms, wind power stations, wind plants, wind parks, and wind energy projects. A wind power plant comprises a number of wind turbines located in the same area in a group onshore or offshore. The wind turbines may be assembled to constitute a total unified power producing unit that can be connected to the utility grid. A wind power plant typically has a "master" or central controller. The central controller may according to an embodiment of the invention be located as part of or in relation to a Supervisory Control And Data Acquisition (SCADA) server.

The central controller may be related to a control station or substation which may comprise a number of computers or processing units. The central controller may also have a processing unit and may typically comprise means for or processing units continuously monitoring the condition of the wind turbines and collect statistics on their operation and may at the same time send control instructions to the wind turbines. The central controller may also control a large number of switchgears, hydraulic pumps valves, and motors within the wind turbine, typically via communication with the wind turbine controller of the wind turbine.

The term information data is in accordance with an embodiment of the invention understood as any data comprising wind turbine information. This may e.g. be measure data from wind turbine components, or it may be information of the active or reactive power set point of the wind turbine. If a central controller has transmitted an active or reactive power set point to a given wind turbine controller, the information data retrieved from a wind turbine component may be the present active or reactive power set point of the wind turbine. The wind turbine may as it is have another active or reactive power set point than the one sent in the "write/read" instruction. This may be possible if for example not there is enough wind to match the active or reactive power set point of the "write/read" instruction.

In an embodiment of the invention, only one single data packet is transmitted from the central controller (CC) to the wind turbine controller (WTC) during one control loop execution in the central controller (CC).

The term "data packet" is according to an embodiment of the invention understood as any type of data packet, frame or datagram comprising information data. A data packet may comprise at least three elements: firstly a header, which marks the beginning of the packet and contains the source and destination address; secondly the payload, which contains the data to be carried inside the packet; and thirdly the trailer, which marks the end of the packet and contains a checksum to check if the packet was corrupted during transmission. Examples of a data packet are an IP (internet protocol) packet, a TCP data packet or a UDP (User Datagram Protocol) data packet.

An IP packet is a chunk of data transferred over the Internet using standard Internet protocol (IP). Each packet begins with a header containing addressing and system control information. TCP is a connection-oriented protocol, which means that a connection is established and maintained until such time as the message or messages to be exchanged by the application programs at each end have been exchanged. UDP is a transport layer protocol in the TCP/IP protocol suite that allows an application program on one host to send a connectionless datagram to an application program on another host.

The terms "write/read" packet, "write/read" telegram or "write/read" instruction is in accordance with the invention understood as a data packet that comprises both an instruction to write and an instruction to read. There may be several practical implementations of the system that supports "write/read" packets. For example, a software component in a wind turbine controller may recognize a "write/read" data packet and thereupon effectuate a write instruction and subsequently effectuate a read instruction of some of the wind turbine components.

A data sequence comprising a "write" instruction immediately followed by a "read" instruction is within the scope of the invention.

Wind turbine components are in accordance with the present invention understood as equipment in the wind turbine. This may be sensors, meters or actuators.

In an embodiment of the invention, said data packet (DP) is an IP package.

In accordance with the invention, the term "control loop" is understood as a continuously repeated process, which for each execution/repetition/loop typically executes at least the following three steps:

obtaining information data related to the wind power plant from the wind turbine in the central controller, performing a comparison of the information data with predefined data to determine an error, and performing a regulating action by means of transmitting a "write" instruction to the wind turbine according to the error.

The present invention performs a fast and simple control loop by means of transmitting both the write and the read instruction to the wind turbine controller within one single data packet. Conventionally, read instructions and write instructions were sent in two or more different data packets. Thus, the present invention may reduce the time of a single evaluation of the control loop by half, which is a very effective optimization of the response time of the wind power plant.

Moreover, the invention relates to a method of controlling a wind turbine from a central controller in a system of at least two wind turbines, wherein said central controller performs the step of transmitting at least one "write/read" telegram to the wind turbine controller.

In an embodiment of the invention, said "write/read" instruction is transmitted to said wind turbine controller within one control loop execution.

In accordance with the invention, the term control loop is understood as a continuously repeated process, which for each repetition/loop typically executes at least the following three steps:

Obtaining one or several measurements from sensors in the wind power plant, performing a comparison of the measurements with a predefined "active or reactive power set point" to detect an error, and performing a regulating action by means of transmitting a "write" instruction to the wind turbine according to the error.

Thus, a control loop in accordance with the invention is understood as a "feedback loop"

In an embodiment of the invention, said "write/read" telegram comprises both an instruction to write values and an instruction to read values in the wind turbine.

In an embodiment of the invention, said "write/read" telegram comprises an instruction to write values, an instruction to read values, and wherein said wind turbine controller responds to the "write/read" instruction by means of transmitting a response telegram comprising a representation of the read values, to the wind turbine.

In an embodiment of the invention, said response telegram comprises a representation of at least one value read in the wind turbine.

In an embodiment of the invention, said "write/read" telegram is allocated higher transmission priority by the wind turbine controller (WTC) and intersection points of the data communication network (DCN).

Intersection points are in accordance with the present invention understood as any point where the data communication network intersects. Examples are switches, links routers, etc.

Moreover, the invention relates to a wind turbine controller comprised in a wind turbine and being connected to at least one wind turbine component (WTCO), wherein the wind turbine controller (WTC) is arranged for receiving data packets (DP) originating from a central controller (CC), where at least one of said data packets comprising instructions, wherein the wind turbine controller (WTC) is arranged for performing the following steps if one of said data packets (DP) comprises a "write/read" instruction (WRI):

effectuating a write instruction designated by the "write/read" instruction (WRI)

retrieving information data (ID) from at least one of said wind turbine components (WTCO), transmitting information data (ID) to said central controller (CC) upon reception of the information data (ID) from at least one wind turbine components (WTCO).

Hereby, the invention relates to a wind turbine controller, adapted for responding to a "write/read" telegram by means of writing/setting at least one value in the wind turbine, reading at least one value in the wind turbine and transmitting a representation of said value back to the central controller station (CC).

Furthermore, the invention relates to a wind power plant system comprising at least two wind turbines, at least two wind turbine controllers according to the invention and related to said wind turbines, a central controller connected to said wind turbines via said wind turbine controllers via a data communication network, wherein the communication between said central controller and said wind turbine controllers is performed by utilizing a communication protocol supporting "write/read" telegrams.

In an embodiment of the invention, said "write/read" data packets comprises information of active power.

Moreover, the invention relates to use of read/write instructions in a network of wind turbines.

BRIEF DESCRIPTION OF THE DRAWINGS

The invention will be described in the following with reference to the figures in which.

DETAILED DESCRIPTION OF THE INVENTION

Figure 1:
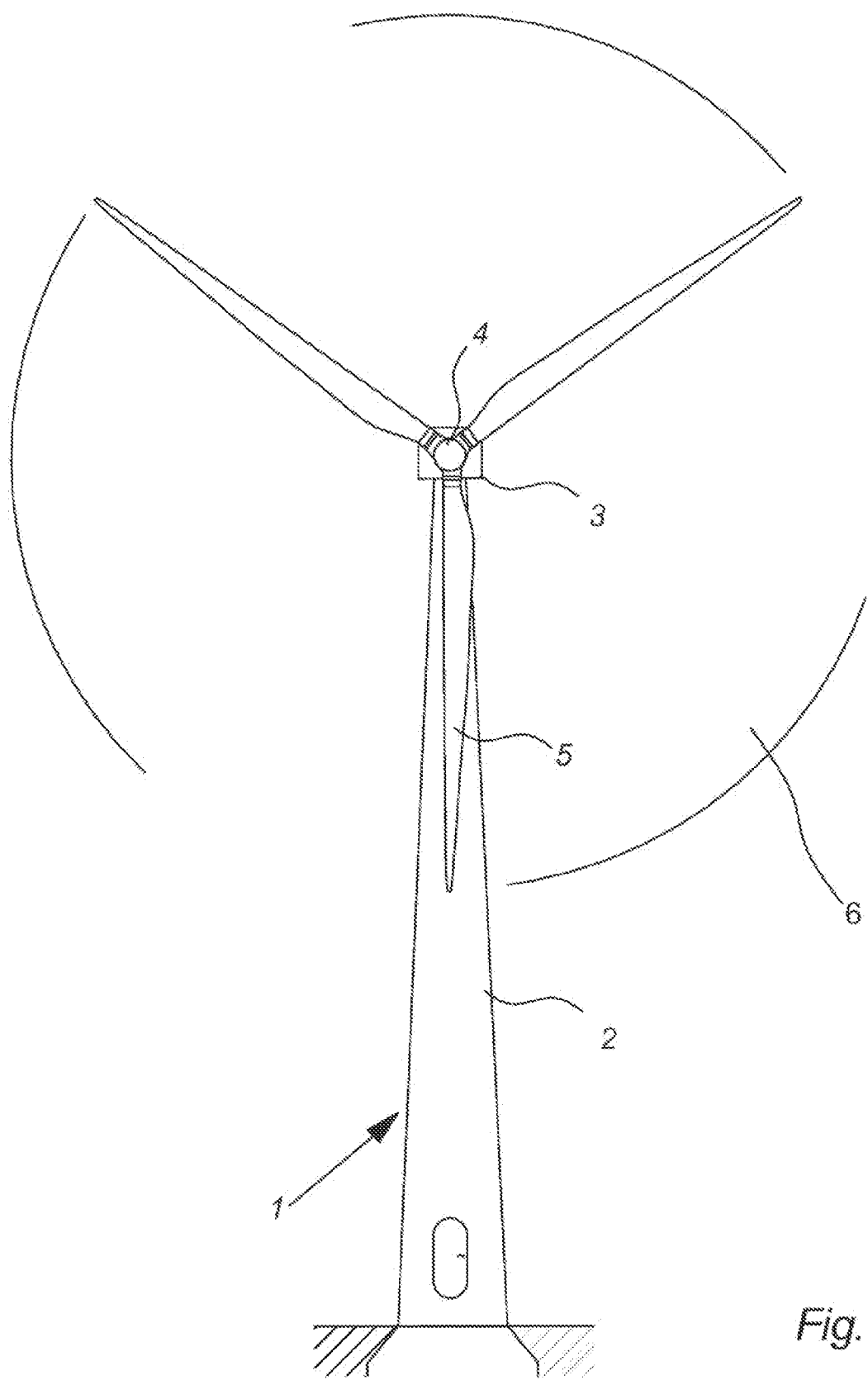
FIG. 1 illustrates a large modern wind turbine as seen from the front.

FIG. 1 illustrates a modern wind turbine 1. The wind turbine 1 comprises a tower 2 positioned on a foundation. A wind turbine nacelle 3 with a yaw mechanism is placed on top of the tower 2.

A low speed shaft extends out of the nacelle front and is connected with a wind turbine rotor through a wind turbine hub 4. The wind turbine rotor comprises at least one rotor blade e.g. three rotor blades 5 as illustrated.

Figure 2:
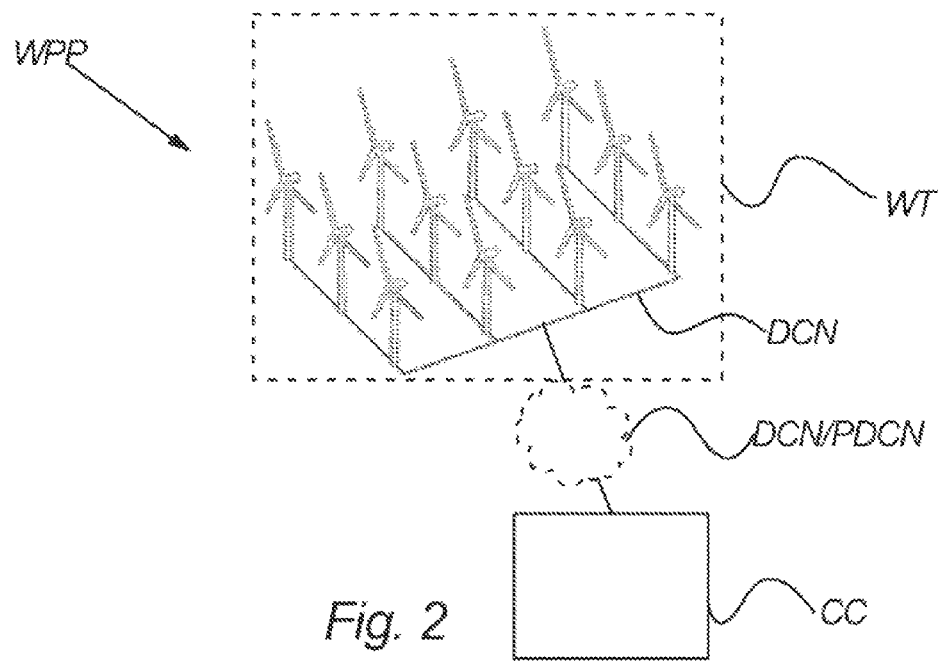
FIG. 2 illustrates an overview of a typical wind power plant.

FIG. 2 illustrates an overview of a typical wind power plant WPP according an embodiment of the invention. A wind power plant may in some contexts be referred to as wind parks or wind farms. A wind power plant comprises a number of wind turbines WT located in the same area in a group onshore or offshore. The wind turbines may be assembled to constitute a total unified power producing unit that can be connected to the utility grid. A wind power plant typically has a "master" or central controller CC. The central controller CC may according to an embodiment of the invention be located as part of or in relation to a SCADA server. The central controller CC may be related to a control station or substation which may comprise a number of computers or processing units. The central controller CC may also have a processing unit and may typically comprise means for continuously monitoring the condition of the wind turbines and collect statistics on its operation and may at the same time send control instructions to the wind turbines. The central controller CC may also control a large number of switchgears, hydraulic pumps valves, and motors within the wind turbine, typically via communication with the wind turbine controller WTC of the wind turbine. The central controller CC may be connected to the wind power plant network DCN locally or remotely via a data communication network DCN or a public data communication network PDCN, e.g. the internet. Control related data may be transmitted to and from the wind turbines WT via a data communication network DCN. The wind turbines may via the data communication network be serial or parallel connected or any combination thereof. The control data may typically be data to control a wind turbine. This may e.g. be instructions to a given wind turbine to change the set point of produced power. Simultaneously, the data communication network DCN is utilized for transmitting monitoring data from the wind turbines in the wind power plant WPP to the central controller CC. This may e.g. be a reading of a pressure meter of a valve of the wind turbine. The data communication network DCN may e.g. comprise a local area network LAN and/or a public data connection network, e.g. the internet.

Figure 3:
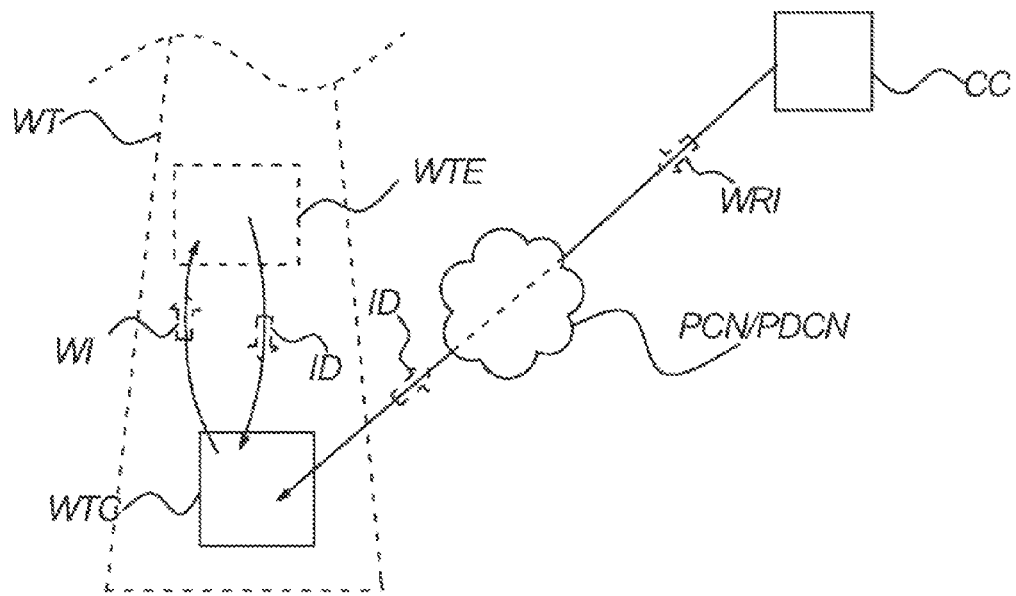
FIG. 3 illustrates a simplified example of the communication between the central controller and the wind turbine.

FIG. 3 illustrates a simplified example of the communication between the central controller CC and the wind turbine WT according to an embodiment of the invention. The figure illustrates a wind turbine WT comprising a wind turbine controller WTC and wind turbine components WTCO. Moreover, the figure illustrates the central controller CC and the wind turbine controller being connected via a data communication network which may be directed via a public data communication network, e.g. the internet. The arrows on the figure illustrate data packets comprising a "write/read" instruction WRI, data packets comprising information data ID, and a data packet comprising a write instruction WI.

A "write/read" instruction WRI comprised in one single data packet may be transmitted from a central controller CC to the wind turbine controller WTC via a data communication network or a public data communication network as a part of a control loop. The wind turbine controller WTC may upon receipt of the "write/read" data packet effectuate the write instruction in one or several wind turbine components WTCO. Subsequently, the wind turbine controller WTC may in accordance with an embodiment of the invention receive information data ID from one or several wind turbine components WTCO. The wind turbine controller WTC may thereupon transmit the information data to the central controller CC. This information data ID, may then be utilized in the control loop to calculate the next active or reactive power set point to be transmitted in the next "write/read" instruction. Thus, only one single data packet is transmitted from the central controller CC to the wind turbine controller WTC and one data packet is transmitted back to the central controller CC during one single control loop of the central controller CC.

Figure 4:
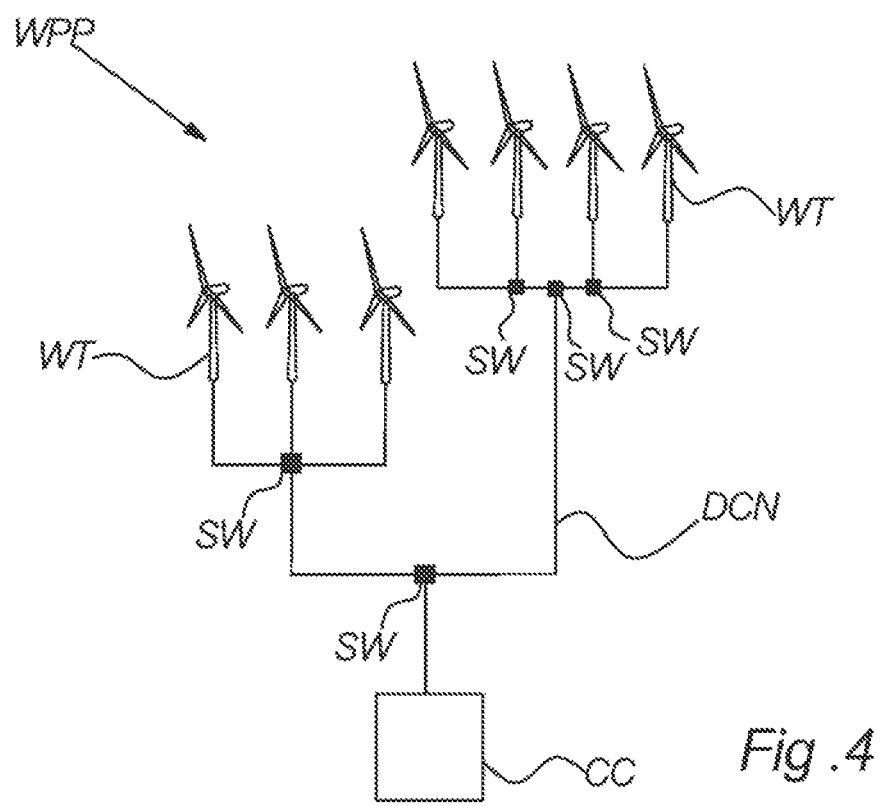
FIG. 4 illustrates the data network of a wind power plant according to an embodiment of the invention.

FIG. 4 illustrates the data network of a wind power plant WPP according to an embodiment of the invention. The figure illustrates a number of wind turbines WT, a central controller CC, and a number of switches SW. Each of the wind turbines WT comprises or is related to a wind turbine controller WTC. Furthermore, the figure illustrates a data communication network DCN. The central controller CC may comprise or be related to a SCADA server. Wind turbine controllers may be located inside the related wind turbines WT, e.g. in the tower, the nacelle, etc., or it may be located outside the wind turbines WT.

In order to control the wind turbines of the wind power plant WPP, the central controller CC performs a control loop, which e.g. may comprise the following steps:

obtaining information data from the wind power plant WPP, performing a comparison of the information data with predefined data to determine an error, and performing a regulating action by means of transmitting a "write" instruction to the wind turbine according to the error.

The present invention performs a fast and simple control loop by means of transmitting both the write and the read instruction to the wind turbine controller within one single data packet. Conventionally, the read and the write were sent in two different data packets. Thus, the present invention may reduce the time of a control loop by half, which is a very effective optimization of the response time of the wind power plant WPP.

In this figure it is illustrated that data packets DP, e.g. a "write/read" packet transmitted between a central controller CC and the wind turbines WT typically must pass several intersection points, i.e. switches SW, to reach its destination. Thus, it is of great importance that the number of data packets is minimized to optimize the expenditure of time.

It should be noted that the illustrated daisy chaining of network components WTCO merely represents one of several applicable network structures.

It should furthermore be noted that the present figure is only one of several applicable data communication networks of a wind power plant WPP in which the present invention may be implemented.

Examples of data to be read in relation with a wind turbine, in relation to the wind turbine controller WTC to be transmitted back to the central controller upon receipt of a "write/read" instruction are:

"Active power measurement". Active power is the total power generated by the wind turbine to be directly used.

"Power Set Point" refers to the desired power to be produced by a given wind turbine WT.

"available power" refers to the possible available energy in the present wind conditions.

"Turbine run state" comprises information of the current run state of a wind turbine e.g. if the wind turbine is shut off.

"Reactive power measurement". The flow of electrical energy from an inductive or capacitive load across a circuit towards a generator. Measured in volt-amperes-reactive (VAR), the conventional symbol for reactive power is "Q". Reactive power results when current is not in phase with voltage—and can be corrected using e.g. capacitors, statcom or other devices.

Examples of a write instruction data to be sent from a central controller CC as a part of a "write/read" packets, are listed in the following:

"Active power set point". An instruction of setting reactive power to a given value.

"Reactive power set point". An instruction of setting active power to a given value.

"Power Factor set point". An instruction of setting Power Factor (Cos(phi)) to a given value.

"Turbine run state" An instruction of setting turbine run state to a given state, e.g. "off".

It should be noted that many other data than the above-mentioned examples may in accordance to the present invention be allocated higher transmission priority.

Figure 5:
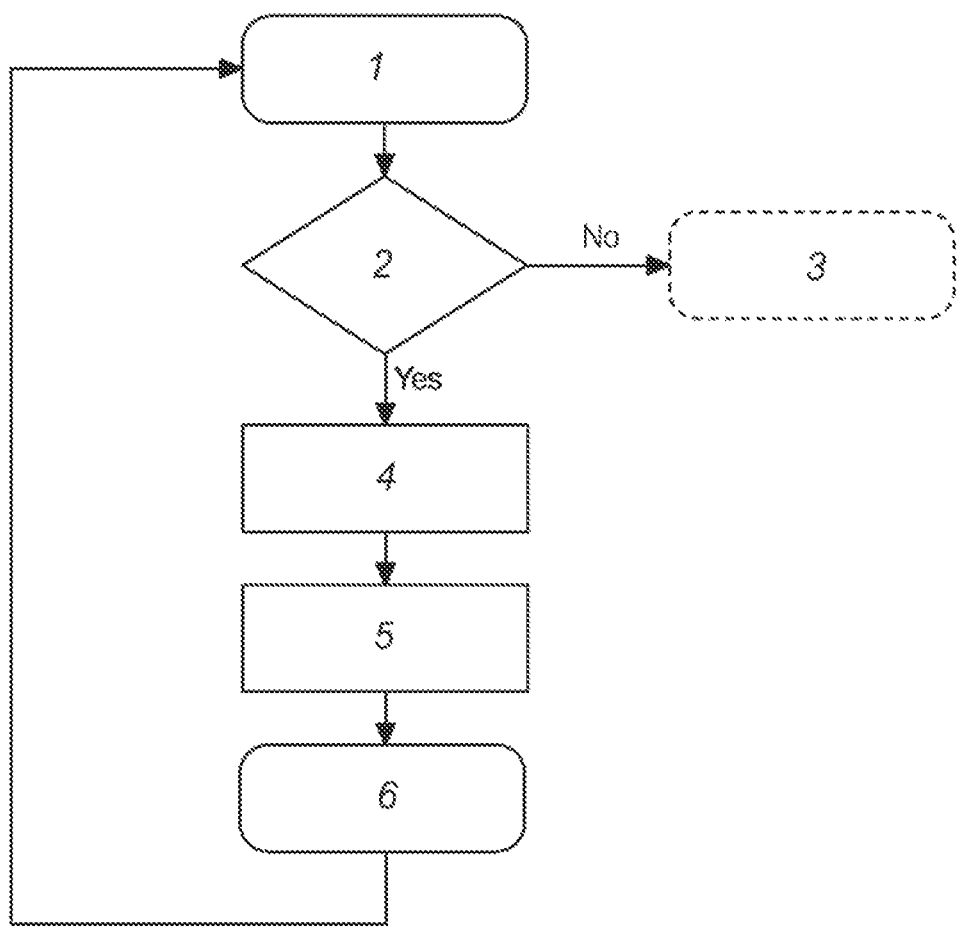
FIG. 5 illustrates a flowchart of the steps in a wind turbine controller according to an embodiment of the invention.

FIG. 5 illustrates a flowchart of the steps in a wind turbine controller WTC according to an embodiment of the invention. In step 1, the wind turbine controller WTC receives a data packet. This may be in a data port of the wind turbine controller WTC or at a protocol handler. In step 2. it is determined whether the received data packet DP is a "write/read" data packet. If no, the wind turbine controller reads the data packet and acts upon it if relevant. If the data packet DP is of a "write/read" type, the wind turbine controller WTC effectuates the write instruction in step 4. This will typically involve a write instruction to wind turbine components WTCO, e.g. an instruction to change the power set point. Subsequently, the wind turbine controller retrieves information data from the wind turbine components WTCO in step 5. This may take some time. When all desired data is read from the wind turbine components WTCO, or a predefined time limit has expired, the wind turbine controller WTC transmits the information data to the central controller CC in step 6.

What is claimed is:

1. A method of controlling a wind turbine in a wind power plant, the wind turbine comprising a wind turbine controller and at least one connected wind turbine component, the method comprising:

receiving, at the wind turbine controller, data packets originating from a central controller, wherein at least one of the data packets is a write/read instruction, the write/read instruction comprising one or more instructions that effectuate both a write function and a read function in the wind turbine; and during a first control loop execution in the central controller:

effectuating a write instruction based on a desired value contained in the write/read instruction, the write instruction setting the desired value as a set point of an attribute of the wind turbine component, retrieving a current value of the attribute from the wind turbine component, and upon receiving the current value from the wind turbine component, transmitting the current value to the central controller, wherein the central controller is configured to determine, during a second control loop execution, an updated value for the set point of the attribute based on the current value, and wherein the updated value is received at the wind turbine controller in a subsequently transmitted write/read instruction.

2. The method of controlling the wind turbine according to claim 1, wherein only one single data packet is transmitted from the central controller to the wind turbine controller during the first control loop execution in the central controller.

3. The method of controlling the wind turbine according claim 1, wherein the data packets are internet protocol packets.

4. The method of controlling the wind turbine according claim 1, further comprising transmitting, to the central controller, a response data packet comprising the current value retrieved as a result of performing the read function, wherein the write function and the read function of the write/read instruction are performed and the response data packet is transmitted during the first control loop execution in the central controller.

5. A wind turbine controller located in a wind turbine and connected to at least one wind turbine component of the wind turbine, the wind turbine controller comprising:
- control circuitry configured to receive data packets originating from a central controller, where at least one of the data packets is a write/read instruction, the write/read instruction comprising one or more instructions that effectuate both a write function and a read function in the wind turbine,
- wherein, during a first control loop execution in the central controller, the control circuitry is configured to:
  - effectuate a write instruction based on a desired value contained in the write/read instruction, the write instruction setting the desired value as a set point of an attribute of the wind turbine component,
  - retrieve a current value of the attribute from the wind turbine component, and
  - upon receiving the current value from the wind turbine component, transmit the current value to the central controller,
- wherein the central controller is configured to determine, during a second control loop execution, an updated value for the set point of the attribute based on the current value, and wherein the updated value is received at the wind turbine controller in a subsequently transmitted write/read instruction.

6. The wind turbine controller of claim 5, wherein the control circuitry is configured to transmit a response data packet comprising the current value retrieved as a result of performing the read function, wherein the write function and the read function of the write/read instruction are performed and the response data packet is transmitted during the first control loop execution in the central controller.

7. The wind turbine controller of claim 5, wherein only one single data packet is transmitted from the central controller to the wind turbine controller during the first control loop execution in the central controller.

8. The wind turbine controller of claim 5, wherein the data packets are internet protocol packets.

9. A method comprising:
- establishing a data communication network connecting a plurality of wind turbines to a central controller; and
- transmitting a write/read instruction to at least one of the plurality of wind turbines on the data communication network, the write/read instruction comprising one or more instructions that effectuate both a write function and a read function in the one wind turbine;
- during a first control loop executing in the central controller:
  - effectuating a write instruction based on a desired value contained in the write/read instruction, the write instruction setting the desired value as a set point of an attribute of a wind turbine component in the one wind turbine,
  - retrieving a current value of the attribute from the wind turbine component, and
  - upon receiving the current value from the wind turbine component, transmitting the current value to the central controller;
- determining, during a second control loop in the central controller, an updated value for the set point of the attribute based on the current value; and
- transmitting the updated value to the one wind turbine in a subsequent write/read instruction.

10. The method of claim 9, further comprising, during the first control loop, transmitting a response data packet comprising the current value retrieved as a result of performing the read function, wherein the write function and the read function of the write/read instruction are performed and the response data packet is transmitted during the first control loop execution in the central controller connected to the data communication network.

11. The method of claim 10, further comprising:
- transmitting respective write/read instructions to each of the plurality of wind turbines, wherein respective controllers in the plurality of wind turbine are configured to transmit a response data packet to the central controller comprising the current value retrieved as a result of performing the read function of the respective write/read instructions.

12. The method of claim 9, wherein only one single data packet is transmitted from the central controller to the one wind turbine during the first control loop execution in the central controller.

13. The method of claim 9, wherein the data packets are internet protocol packets.

* * * * *